(12) United States Patent
Fanjoy

(10) Patent No.: US 6,801,051 B1
(45) Date of Patent: Oct. 5, 2004

(54) SYSTEM AND METHOD FOR PROVIDING CAPACITIVE SPARE FILL CELLS IN AN INTEGRATED CIRCUIT

(75) Inventor: Kevin R. Fanjoy, Fort Collins, CO (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 0 days.

(21) Appl. No.: 10/417,002

(22) Filed: Apr. 16, 2003

(51) Int. Cl.[7] .............................................. H03K 13/003
(52) U.S. Cl. .............................. 326/13; 326/10; 326/9; 326/15
(58) Field of Search .................................. 326/9–10, 13, 326/15, 37, 41, 47

(56) References Cited

U.S. PATENT DOCUMENTS

| | | | |
|---|---|---|---|
| 5,959,905 A | | 9/1999 | Payne |
| 6,255,845 B1 | * | 7/2001 | Wong et al. .................. 326/38 |
| 6,404,226 B1 | * | 6/2002 | Schadt ........................ 326/41 |

\* cited by examiner

*Primary Examiner*—Anh Q. Tran

(57) ABSTRACT

A processor includes an integer unit operable to execute integer instructions and a floating point unit operable to execute floating point instructions. The processor also includes at least one spare fill cell disposed in at least one portion of the processor that is not occupied by the integer unit and the floating point unit. The at least one spare fill cell includes at least one spare transistor configured as a capacitor and coupled to a voltage rail and a ground rail.

18 Claims, 3 Drawing Sheets

US 6,801,051 B1

SYSTEM AND METHOD FOR PROVIDING CAPACITIVE SPARE FILL CELLS IN AN INTEGRATED CIRCUIT

TECHNICAL FIELD

This disclosure is generally directed to integrated circuits and more specifically to a system and method for providing capacitive spare fill cells in an integrated circuit.

BACKGROUND

Conventional microprocessor chips and other integrated circuits typically use voltage and ground rails to provide operating power to various components in the circuits. These circuits routinely suffer from "voltage droops" and "ground bounces." In a voltage droop, the voltage supplied by a voltage is rail falls below a threshold required for proper operation of a circuit. In a ground bounce, a ground rail acquires a voltage greater than zero, which may also interfere with the proper operation of the circuit. In conventional integrated circuits, large capacitors are often used to stabilize the voltages of the voltage and ground rails.

SUMMARY

This disclosure provides a system and method for providing capacitive spare fill cells in an integrated circuit.

In one embodiment, an integrated circuit includes logic operable to perform at least one function. The integrated circuit also includes at least one spare fill cell disposed in at least one portion of the integrated circuit that is not occupied by the logic. The at least one spare fill cell includes at least one spare transistor configured as a capacitor and coupled to a voltage rail and a ground rail.

In another embodiment, a processor includes an integer unit operable to execute integer instructions and a floating point unit operable to execute floating point instructions. The processor also includes at least one spare fill cell disposed in at least one portion of the processor that is not occupied by the integer unit and the floating point unit. The at least one spare fill cell includes at least one spare transistor configured as a capacitor and coupled to a voltage rail and a ground rail.

In yet another embodiment, a method includes fabricating logic operable to perform at least one function in an integrated circuit. The method also includes fabricating at least one spare fill cell disposed in at least one portion of the integrated circuit that is not occupied by the logic. The at least one spare fill cell includes at least one spare transistor. The method further includes configuring the at least one spare transistor as a capacitor coupled to a voltage rail and a ground rail.

One or more technical features may be present according to various embodiments of this disclosure. Particular embodiments of this disclosure may exhibit none, some, or all of the following features depending on the implementation. For example, in one embodiment, a system for providing capacitive spare fill cells is provided. In particular, an integrated circuit includes one or more spare fill cells, which contain at least one unused or "spare" transistor. These transistors may be used to implement future modifications to the integrated circuit. For example, a modification to the design of the integrated circuit may be needed in the future, and the modification may require the use of additional transistors. The spare transistors in the spare fill cells can be used to implement the modification to the integrated circuit.

In this way, the modification may not require extensive rearrangement and remapping of the components of the integrated circuit.

Moreover, while the spare fill cells are not being used to implement functions performed by the integrated circuit, the spare transistors can be configured to act as capacitors in the integrated circuit. The capacitive transistors may then be used to help stabilize voltage and ground rails in the integrated circuit. This may help to reduce or eliminate the need to use other capacitors to stabilize the voltage and ground rails. This may also help to reduce the size of the integrated circuit.

This has outlined rather broadly several features of this disclosure so that those skilled in the art may better understand the DETAILED DESCRIPTION that follows. Additional features may be described later in this document. Those skilled in the art should appreciate that they may readily use the concepts and the specific embodiments disclosed as a basis for modifying or designing other structures for carrying out the same purposes of this disclosure. Those skilled in the art should also realize that such equivalent constructions do not depart from the spirit and scope of the invention in its broadest form.

Before undertaking the DETAILED DESCRIPTION below, it may be advantageous to set forth definitions of certain words and phrases Used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely. Definitions for certain words and phrases are provided throughout this patent document, and those of ordinary skill in the art should understand that in many, if not most instances, such definitions apply to prior as well as future uses of such defined words and phrases.

BRIEF DESCRIPTION OF THE DRAWINGS

For a more complete understanding of this disclosure and its features, reference is now made to the following description taken in conjunction with the accompanying drawings, in which.

DETAILED DESCRIPTION

Figure 1:
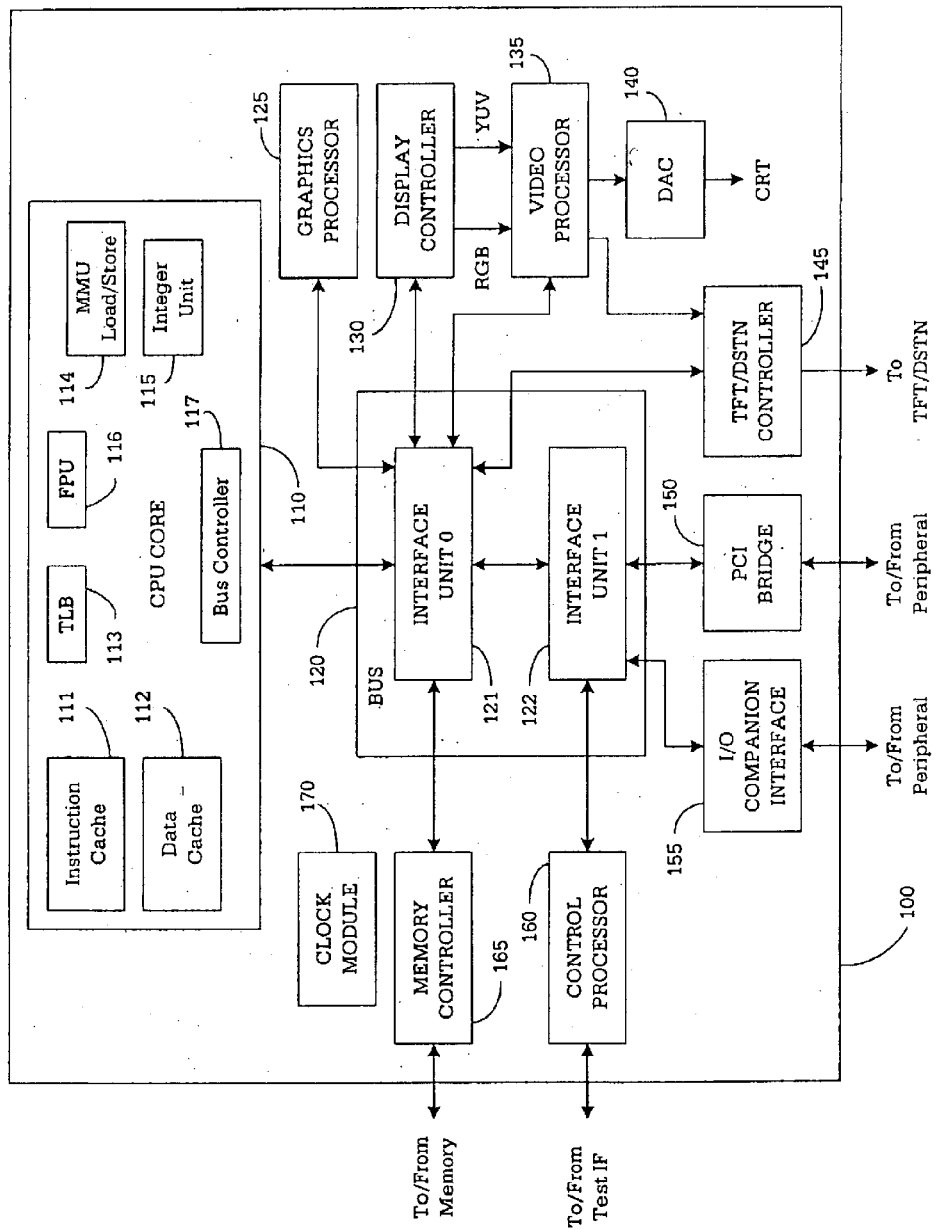
FIG. 1 illustrates an example processing system according to one embodiment of this disclosure.

FIG. 1 illustrates an example processing system 100 according to one embodiment of this disclosure. The processing system 100 illustrated in FIG. 1 is for illustration only. Other processing systems or integrated circuits could be used without departing from the scope of this disclosure.

In one aspect of operation, one or more components of the processing system 100 include at least one spare fill cell. A "spare fill cell" refers to a portion of a chip or other integrated circuit where one or more spare components are placed. The spare fill cell includes one or more transistors configured to act as capacitors. The capacitive transistors are used to stabilize voltages supplied by voltage and ground rails, which supply operating power to the components of the processing system 100. The use of the capacitive transistors may help to reduce or eliminate the use of large capacitors to stabilize the voltages supplied by the rails. This may also help to reduce the size of the processing system 100.

In the illustrated example, the processing system 100 includes a central processing unit (CPU) core 110. The CPU core 110 executes instructions, such as integer instructions and floating point instructions. For example, the CPU core 110 could execute instructions contained in an application executed by a host computer. In one embodiment, the processing system 100 represents an x86 compatible device. In a particular embodiment, the CPU core 110 executes instructions in a combination of instruction sets, such as the Intel Pentium, Intel Pentium Pro, AMD K6 3DNow!, AMD K7 3DNow!, AMD K7 MMX, and National Semiconductor GX1 instruction sets.

In this example, the CPU core 110 includes an instruction cache 111, a data cache 112, a translation look-aside buffer (TLB) 113, a memory management unit (MMU) load/store block 114, an integer unit 115, a floating point unit (FPU) 116, and a bus controller 117. The instruction cache 111 and the data cache 112 represent memories used to store and facilitate retrieval of information used by the CPU core 110. For example, the instruction cache 111 could store instructions that have been, are, or may be executed by the integer unit 115 or the FPU 116. The data cache 112 could store data being processed by the integer unit 115 or the FPU 116, such as operands in an arithmetic operation. The caches 111, 112 could represent any suitable memory device or combination of devices. In one embodiment, each cache 111, 112 represents sixteen kilobytes of memory space. In a particular embodiment, each cache 111, 112 represents a single-clock access, sixteen kilobyte, four-way set associative cache. While FIG. 1 illustrates two separate caches 111, 112, the caches 111, 112 could be combined into a single memory or further subdivided into additional memories. Also, the caches 111, 112 could store any other or additional information.

The TLB 113 and MMU 114 support the use of virtual memory addresses by the processing system 100. For example, the processing system 100 may allow applications to use virtual addresses to store and retrieve instructions and data. When the application is executed, the MMU 114 may receive the virtual memory address and access the TLB 113. The TLB 113 includes a table identifying various virtual addresses and the physical addresses corresponding to those virtual addresses. Using the TLB 113, the MMU 114 converts the received virtual address into a physical memory address. The processing system 100 may then use is the physical memory address to access a memory.

The integer unit 115 executes integer instructions. In one embodiment, the integer unit 115 includes a single-issue, eight-stage pipeline. In a particular embodiment, the integer pipeline includes an instruction prefetch stage, an instruction predecode stage, an instruction decode stage, an instruction queue stage, two address calculation stages, an execution stage, and a writeback stage.

In the instruction prefetch stage, raw instructions are fetched from the instruction cache 111. The instruction predecode stage extracts prefix bytes from the raw instruction bits. The predecode operation also looks-ahead to the next instruction and a potential bubble can be eliminated if the pipeline stalls downstream. The instruction decode stage performs a full decode of the instruction data and indicates the instruction length back to the prefetch stage, allowing the prefetch stage to shift the appropriate number of bytes to the beginning of the next instruction.

The instruction queue stage comprises a first in-first out (FIFO) queue containing decoded x86 instructions. The instruction queue allows the instruction decode stage to proceed even if the pipeline is stalled downstream. Register read operations for data operand address calculations are performed in the instruction queue stage. The first address calculation stage computes the linear address of operand data (if required) and issues requests to data cache 112. Microcode can take over the pipeline and inject a micro-box if multi-box instructions require additional data operands. In the second address calculation stage, operand data (if required) is returned and set up to the execution unit stage with no bubbles if there was a data cache hit. Segment limit checking also is performed on the data operand address. The micro-read-only-memory ($\mu$ROM) is read for setup to the execution unit stage.

In the execution unit stage, register and/or data memory fetches are fed through an arithmetic logic unit (ALU) for arithmetic or logical operations. The $\mu$ROM may fire for the first instruction box into the pipeline. Microcode may control the pipeline and insert additional boxes in the execution unit stage if the instruction requires multiple execution unit stages to complete. The writeback stage writes results of the execution unit stage to the register file or to data memory.

The FPU 116 executes floating point instructions. In one embodiment, the FPU 116 includes multiple pipelines, such as an execution pipeline and a load/store pipeline. Also, the FPU 116 can execute instructions in one or more instruction sets, such as the x87, MMX, and 3DNow! instruction sets. The FPU 116 could also support dynamic scheduling of instructions, which may help to reduce stalls in the pipelines of the FPU 116. The FPU 116 could further support out-of-order execution and register renaming. In addition, the FPU 116 could perform floating point operations in accordance with the IEEE 754 standard and support an instruction issue rate of one instruction per clock from the integer core. In a particular embodiment, the FPU 116 could have a data path that is optimized for single precision arithmetic, while extended precision arithmetic is handled by microcode and multiple passes through the pipelines of the FPU 116.

The bus controller 117 facilitates communication between the CPU core 110 and other components of the processing system 100. For example, when needed data is not available in the caches 111, 112, the bus controller 117 could support the transfer of the data from the external memory to the CPU core 110 over an internal bus 120.

The internal bus 120 facilitates communication between various components of the processing system 100. In this example, the bus 120 includes a first interface unit 121 and a second interface unit 122. The first interface unit 121 facilitates communication between higher-speed components of the processing system 100, while the second interface unit 122 facilitates communication between lower-speed components of the processing system 100. The interface units 121, 122 may also communicate with each other so that the higher-speed components and the lower-speed components may communicate. While FIG. 1 may illustrate a certain component of the processing system 100 as representing a "higher-speed" or "lower-speed" component, this is for illustration only. Each component could operate at any suitable speed.

A graphics processor 125 processes graphics data for display to a user. The graphics processor 125 could, for example, include a bit block transfer (bitBLT) engine, a raster operations (ROP) unit, and an alpha compositing unit. The bitBLT engine transforms blocks of pixels, such as by changing colors or shades of pixels or rotating a block of pixels. The ROP unit performs various raster operations on the graphics data, such as 256 standard raster operations. The alpha compositing unit supports transparency of the graphics data. The graphics processor 125 could further support pattern generation, source expansion, pattern/source transparency, and ternary raster operations.

A display controller 130 generates displays for presentation to a user, including displays using the graphics produced by the graphics processor 125. The display controller 130 may retrieve graphics, video, and overlay streams from a frame buffer, serialize the streams, and perform any color lookups and output formatting. The display controller 130 may also interface with a display filter for driving a display device. The display controller 130 may include a graphical user interface (GUI) and a video graphics array (VGA), which provides full hardware compatibility with the VGA graphics standard. For example, the VGA may pass eight-bit pixels and sync signals to the GUI, which may expand the pixels to 24-bit color values using a color lookup table.

A video processor 135 receives graphics data, video data, or other information to be displayed. The video processor 135 then outputs digital data capable of being displayed to a user. For example, the video processor 135 could mix graphics and video streams and output digital red, green, and blue (RGB) data. The video processor 135 could be capable of delivering high resolution and true color graphics. The video processor 135 may also overlay or blend a scaled true color video image on the graphics background.

The output of the video processor 135 may be supplied to a digital to analog converter (DAC) 140 or a Thin Film Transistor/Double-Layer Supertwist Nematic (TFT/DLSN) controller 145. The DAC 140 converts the digital values from the video processor 135 into analog values for display on a cathode ray tube (CRT). The DAC 140 may, for example, represent a 3×8 bit DAC. The TFT/DLSN controller 145 uses the digital values from the video processor 135 to generate a digital output signal suitable for display on a flat-panel liquid crystal display (LCD). In a particular embodiment, the TFT/DSTN controller 145 may drive all standard flat panel monitors up to 1024×768 resolution.

A peripheral component interconnect (PCI) bridge 150 facilitates communication with an external PCI bus. For example, the PCI bridge 150 could support communication with a sound card, disk drive, or other device over the PCI bus. In one embodiment, the PCI bridge 150 includes read and write FIFO queues, an interface controller, and a PCI arbiter.

An input/output (I/O) companion interface 155 allows the processing system 100 to receive several signals that support functions such as resets, interrupts, and system power management.

A control processor 160 manages reset control, the macro clock, and debugging functions in the processing system 100. In one embodiment, the control processor 160 includes a JTAG interface and scan chain control logic. The control processor 160 also supports chip reset, which includes initial phase-locked loop (PLL) control and programming, and runtime power management macro-clock control. The JTAG support may include a TAP controller that is IEEE 1149.1 compliant. Control of the processing system 100 can be obtained through the JTAG interface into the TAP controller. Internal registers, including registers in the CPU core 110, may be accessed. In-circuit emulation (ICE) capabilities may be supported through the JTAG and TAP controller interface.

A memory controller 165 facilitates access to one or more external memories, such as one or more RAM modules or a mass storage device like a hard drive. For example, various components of the processing system 100, such as the CPU core 110, graphics processor 125, display controller 130, and TFT/DSTN controller 145, may need to store or retrieve data from the external memory, and the memory controller 165 facilitates access to the external memory. In one embodiment, the memory controller 165 can facilitate access to both single data rate (SDR) and dual data rate (DDR) memory. Also, the memory controller 165 can facilitate access to any amount of external memory, such as one gigabyte of memory. In a particular embodiment, the memory controller 165 allows data used by the CPU core 110 and graphics data to be stored in the external memory, thereby supporting a unified memory architecture (UMA).

A clock module 170 generates clock signals used by the various components of the CPU 100. For example, the clock module 170 could generate signals used by the CPU core 110 to execute integer and floating point instructions.

In one aspect of operation, one or more components of the processing system 100 include at least one spare fill cell. A spare fill cell includes at least one spare transistor, and at least one of the spare transistors is configured to act as a capacitor. These capacitive spare transistors can then be used to stabilize voltages supplied by voltage and ground rails in the processing system 100. If a future modification to the processing system 100 requires additional transistors, the spare transistors can be used to implement the modification. The processing system 100 could include any number of spare transistors configured as capacitors. As a particular example, the processing system 100 could include up to a million spare transistors or more, and some or all of the transistors could be capacitive.

Although FIG. 1 illustrates one example of a processing system 100, various changes may be made to FIG. 1. For example, the capacitive transistors described above could be used in any other processing system or any other integrated circuit and are not limited to the processing system 100 illustrated in FIG. 1. Also, the functional division of the components in FIG. 1 is for illustration only. Various components can be combined or omitted and additional components can be added according to particular needs. In addition, each component illustrated in FIG. 1 may be implemented in any hardware, software, firmware, or combination thereof.

Figure 2:
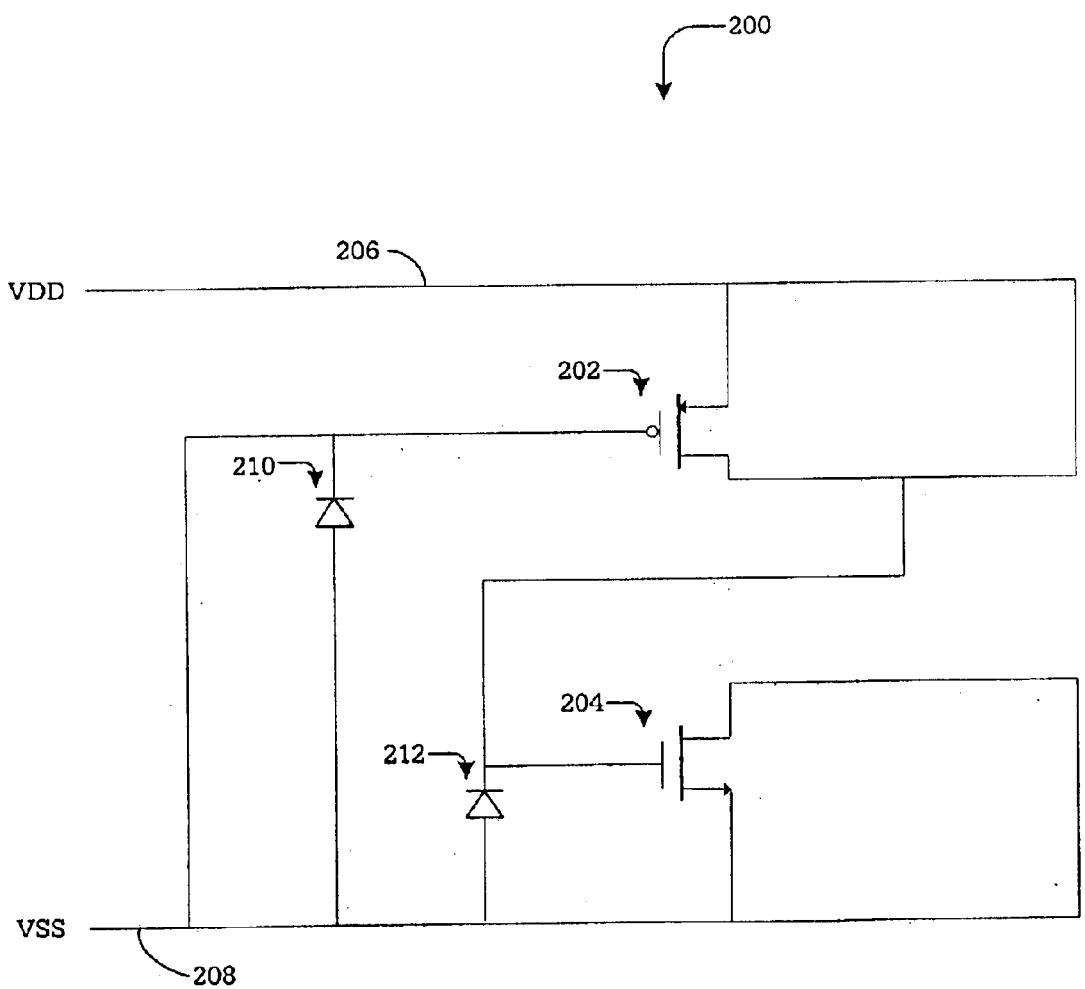
FIG. 2 illustrates an example spare fill cell according to one embodiment of this disclosure.

FIG. 2 illustrates an example spare fill cell 200 according to one embodiment of this disclosure. The spare fill cell 200 shown in FIG. 2 is for illustration only. Other spare fill cells could be used without departing from the scope of this disclosure.

As shown in FIG. 2, the spare fill cell 200 includes two transistors 202, 204. The transistors 202, 204 are coupled to a voltage rail 206 and a ground rail 208. The source and drain of the first transistor 202 are coupled to the voltage rail 206, and the gate is coupled to the ground rail 208. This configures the first transistor 202 as a p-type capacitor. The source and drain of the second transistor 204 are coupled to the ground rail 208, and the gate is coupled to the voltage rail 206. This configures the second transistor 204 as an n-type capacitor.

In this example, the transistors 202, 204 are capacitive and help to stabilize the voltage supplied by the voltage rail 206 and the ground rail 208. For example, the use of the capacitive transistors 202, 204 may help to reduce or eliminate voltage droops involving the voltage rail 206 and ground bounces involving the ground rail 208.

The spare fill cell 200 further includes two diodes 210, 212. The first diode 210 is used for antenna charge protection during the manufacturing process. The second diode 212 helps to prevent a current from flowing from the voltage rail 206 to the ground rail 208 and forces the current into the gate of the second transistor 204.

In a particular embodiment, each transistor 202, 204 has a width of 1.6 micrometers and a length of 150 nanometers. Also, each diode 210, 212 has an area of $2.033 \times 10^{-13}$ square meters.

In this example embodiment, the spare transistors 202, 204 in the spare fill cell 200 can be used as capacitors in the processing system 100 or other integrated circuit. Rather than having unused transistors in the integrated circuit and using separate capacitors to stabilize the voltage rail 206 and the ground rail 208, the spare transistors 202, 204 are used to stabilize the voltage rail 206 and the ground rail 208. As a result, the use of capacitive transistors 202, 204 helps to decrease the size of the integrated circuit.

Although FIG. 2 illustrates one example of a spare fill cell 200, various changes may be made to FIG. 2. For example, any suitable number of transistors can be used in the spare fill cell 200.

Figure 3:
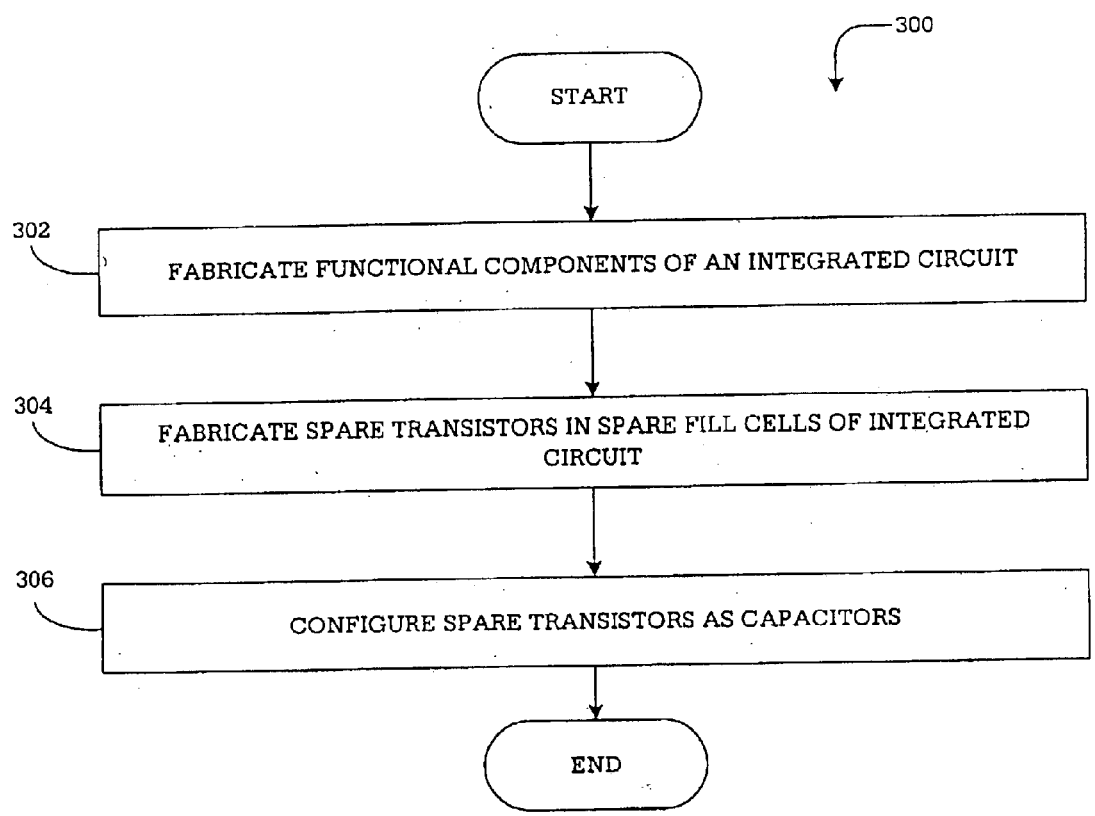
FIG. 3 illustrates an example method for providing capacitive spare fill cells in an integrated circuit according to one embodiment of this disclosure.

FIG. 3 illustrates an example method 300 for providing capacitive spare fill cells in an integrated circuit according to one embodiment of this disclosure. The method 300 may be described with respect to the processing system 100 of FIG. 1 including the spare fill cell 200 of FIG. 2. The method 300 could be used with any other suitable integrated circuit and any other suitable spare fill cell.

The functional components of an integrated circuit are fabricated at step 302. This may include, for example, fabricating transistors and other components in the various modules of the processing system 100 shown in FIG. 1. The transistors and other components may represent the logic used to implement the functions of the modules in the processing system 100.

Spare transistors are fabricated in the integrated circuit at step 304. This may include, for example, fabricating one or more spare transistors 202, 204 in a spare fill cell 200 of the integrated circuit. The spare transistors 202, 204 could be fabricated at any suitable location or locations in the integrated circuit.

The spare transistors are configured as capacitors at step 306. This may include, for example, coupling the source and drain of the spare transistor 202 to a voltage rail 206 and the gate of the spare transistor 202 to a ground rail 208. This may also include coupling the source and drain of the spare transistor 204 to the ground rail 208 and the gate of the spare transistor 204 to the voltage rail 206.

Although FIG. 3 illustrates one example of a method 300 for providing capacitive spare fill cells in an integrated circuit, various changes may be made to FIG. 3. For example, the spare transistors could be fabricated before the functional components of the integrated circuit.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An integrated circuit, comprising:
   logic operable to perform at least one function; and
   at least one spare fill cell disposed in at least one portion of the integrated circuit that is not occupied by the logic, the at least one spare fill cell comprising at least one spare transistor configured as a capacitor and coupled to a voltage rail and a ground rail.

2. The integrated circuit of claim 1, wherein the at least one spare fill cell comprises at least two transistors, a first of the transistors configured as a p-type capacitor and a second of the transistors configured as an n-type capacitor.

3. The integrated circuit of claim 2, wherein the spare fill cell further comprises:
   a first diode coupled to a gate of the first transistor and the ground rail; and
   a second diode coupled to a drain of the first transistor, a gate of the second transistor, and the ground rail.

4. The integrated circuit of claim 1, wherein the at least one spare transistor at least partially stabilizes voltages supplied by the voltage and ground rails and at least partially reduces voltage droops and ground bounces.

5. The integrated circuit of claim 1, wherein:
   the integrated circuit comprises a processor; and
   the logic comprises a central processing unit core operable to execute integer and floating point instructions and a memory controller operable to facilitate access to an external memory.

6. The integrated circuit of claim 5, wherein the processor comprises at least one million transistors configured as capacitors in the at least one spare fill cell.

7. A processor, comprising:
   an integer unit operable to execute integer instructions;
   a floating point unit operable to execute floating point instructions; and
   at least one spare fill cell disposed in at least one portion of the processor that is not occupied by the integer unit and the floating point unit, the at least one spare fill cell comprising at least one spare transistor configured as a capacitor and coupled to a voltage rail and a ground rail.

8. The processor of claim 7, wherein the at least one spare fill cell comprises at least two transistors, a first of the transistors configured as a p-type capacitor and a second of the transistors configured as an n-type capacitor.

9. The processor of claim 8, wherein the spare fill cell further comprises:
   a first diode coupled to a gate of the first transistor and the ground rail; and
   a second diode coupled to a drain of the first transistor, a gate of the second transistor, and the ground rail.

10. The processor of claim 7, wherein the at least one spare transistor at least partially stabilizes voltages supplied by the voltage and ground rails and at least partially reduces voltage droops and ground bounces.

11. The processor of claim 7, wherein the processor comprises at least one million transistors configured as capacitors in the at least one spare fill cell.

12. The processor of claim 7, further comprising a memory controller operable to facilitate access to an external memory.

13. A method, comprising:
fabricating logic operable to perform at least one function in an integrated circuit;
fabricating at least one spare fill cell disposed in at least one portion of the integrated circuit that is not occupied by the logic, the at least one spare fill cell comprising at least one spare transistor; and
configuring the at least one spare transistor as a capacitor coupled to a voltage rail and a ground rail.

14. The method of claim 13, wherein:
fabricating the at least one spare fill cell comprises fabricating at least two transistors; and
configuring the at least one spare transistor comprises configuring a first of the transistors as a p-type capacitor and configuring a second of the transistors as an n-type capacitor.

15. The method of claim 14, wherein fabricating the at least one spare fill cell further comprises:
coupling a first diode to a gate of the first transistor and the ground rail; and
coupling a second diode to a drain of the first transistor, a gate of the second transistor, and the ground rail.

16. The method of claim 13, wherein the at least one spare transistor at least partially stabilizes voltages supplied by the voltage and ground rails and at least partially reduces voltage droops and ground bounces.

17. The method of claim 13, wherein:
the integrated circuit comprises a processor; and
the logic comprises a central processing unit core operable to execute integer and floating point instructions and a memory controller operable to facilitate access to an external memory.

18. The method of claim 17, wherein the processor comprises at least one million transistors configured as capacitors in the at least one spare fill cell.

* * * * *